United States Patent [19]
Westerhoff

[11] 3,805,826
[45] Apr. 23, 1974

[54] COVER AND RELIEF VALVE FOR CLEANOUT PIPE

[76] Inventor: William G. Westerhoff, 2857 Oceanside Blvd., Oceanside, Calif. 92054

[22] Filed: Dec. 26, 1972

[21] Appl. No.: 318,013

[52] U.S. Cl............ 137/516.11, 137/236, 137/533, 137/533.17
[51] Int. Cl............................................ F16k 15/00
[58] Field of Search . 137/236, 247.11, 533, 533.17, 137/516.11, 516.13; 4/219

[56] References Cited
UNITED STATES PATENTS

| | | |
|---|---|---|
| 924,711 | 6/1909 | Williams .............................. 4/219 |
| 580,588 | 4/1897 | Waters ................................. 4/219 |
| 3,605,132 | 9/1971 | Lineback ......................... 251/368 X |
| 2,834,365 | 5/1958 | Pair ............................... 137/247.11 |
| 3,229,707 | 1/1966 | Suchan ............................... 137/236 |

*Primary Examiner*—Harold W. Weakley
*Attorney, Agent, or Firm*—Duane C. Bowen

[57] ABSTRACT

A cover and relief valve for a cleanout pipe is substituted for the normal cleanout with a threaded plug, or for a backflow valve installation, for a building sewer line. The valve is guidably supported to rise under pressure of backed-up sewage to discharge onto the ground outside of the building, to avoid discharge into the building. The valve is removable for cleanout operations.

4 Claims, 7 Drawing Figures

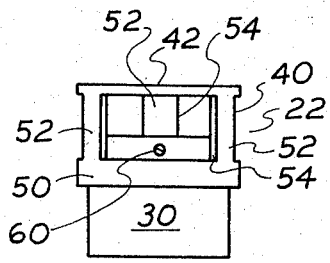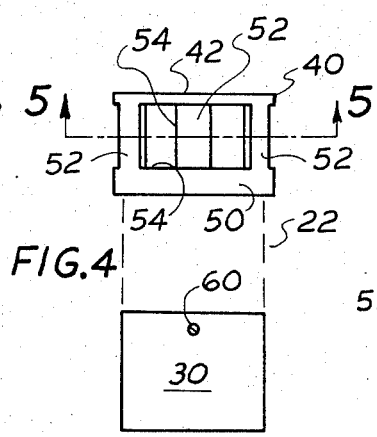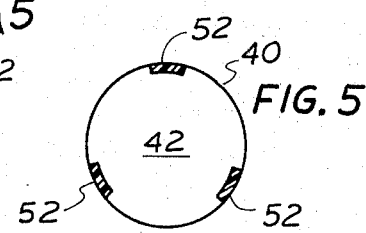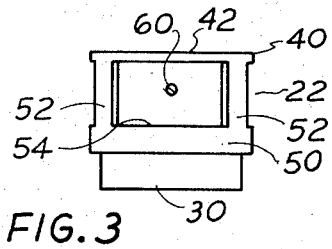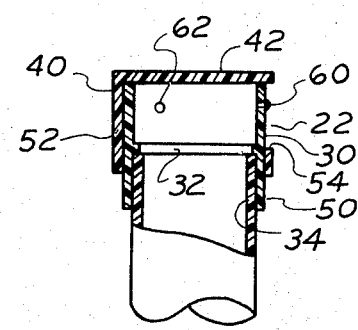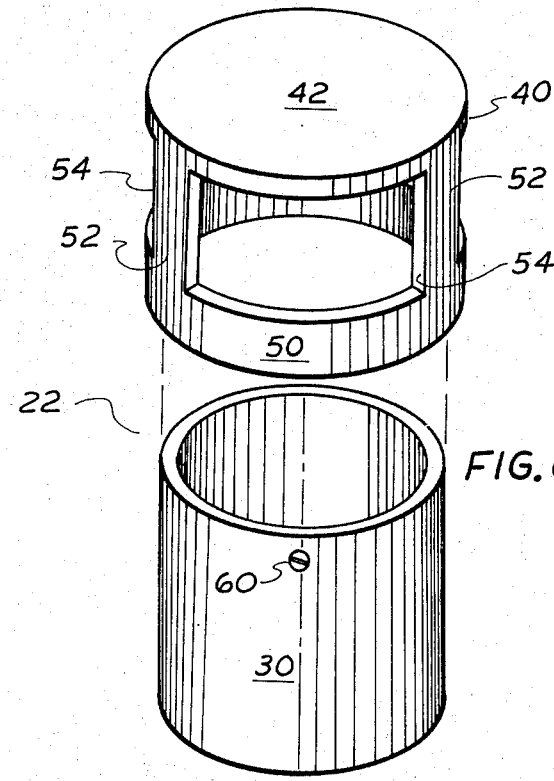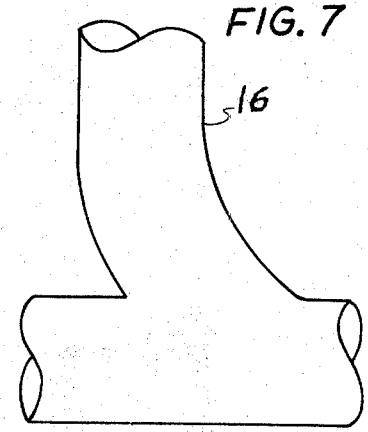

COVER AND RELIEF VALVE FOR CLEANOUT PIPE

BRIEF SUMMARY OF THE INVENTION

A combined cover and relief valve is used for a cleanout pipe, having the characteristics of automatic opening to discharge blocked sewage on the ground and removability for building sewer line cleanout.

The occasion for my invention was the realization, in my occupation as a building inspector, that existing building sewer installations were inadequate to protect the interior of buildings from damage due to discharge of blocked sewage out drains and the like into such interior, that the normal backflow valve to prevent backup of sewage from outside the building sewer line was an expensive installation and none too reliable in operation, and that the normal cleanout with a threaded plug was not particularly convenient and a different structure could be devised to serve additional purposes in preventing building interior damage due to sewage blockage.

The objectives of my invention include to provide a more adequate system to protect the interior of buildings from damage due to blocked sewer lines; to provide the same by improvement to sewer cleanout fixtures; to devise a construction also usable as an improvement over backflow valve installations; and to provide high reliability, low maintenance, simplicity of construction and operation, and low cost of construction and installation.

My invention will be best understood from the following description, read with reference to the drawings, in which:

FIG. 1 is an elevational view, essentially diagrammatical, of a typical building sewer installation incorporating a specific embodiment of my new cover and relief valve for cleanout pipes and the like.

FIG. 2 is an elevational view of the cover and relief valve and mounting coupling, the valve being shown in open position.

FIG. 3 is similar to FIG. 2 only the valve is shown in closed position.

FIG. 4 is similar to FIG. 2 only the valve is shown in removed position.

FIG. 5 is a sectional view taken on line 5—5 of FIG. 4.

FIG. 6 is an enlarged view in perspective of the parts in the removed position shown in FIG. 4.

FIG. 7 is an elevational view of a typical installation, some portions being shown in section or being broken in order to clarify or to facilitate illustration.

Figure 1:
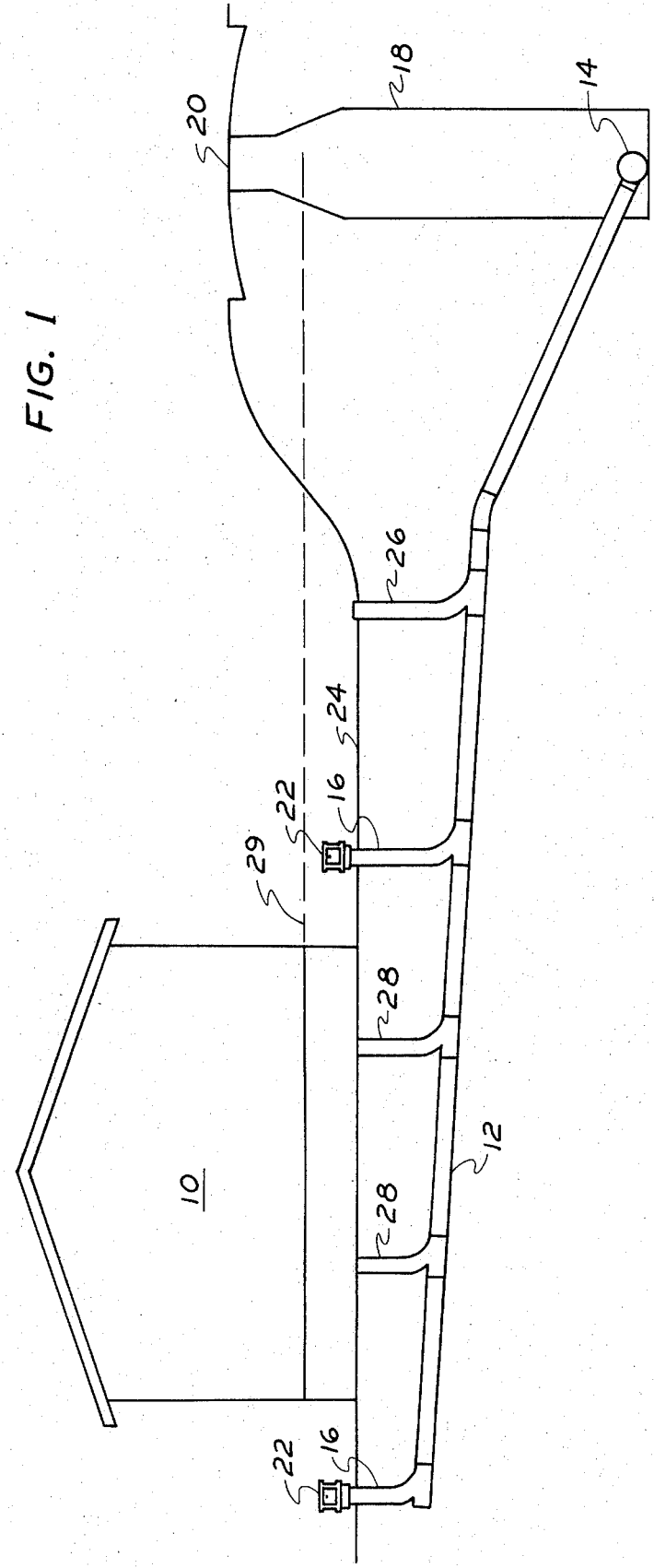

FIG. 1 shows a typical layout of a building 10, a building sewer line 12 and the connection to a main sewer line 14, or to a lateral sewer line. One or more cleanouts 16 are provided. Those illustrated are one-way cleanouts. If, for example, only one cleanout were to be provided in the installation depicted, a cleanout could be provided to the right of the building as viewed, but this should then be a two-way cleanout in order to be able to conduct cleanout operations both upstream and downstream.

Note that the manhole installation 18 shown extends upwardly to a level above the building foundation, in which case there is a requirement that a backflow valve installation should be made in order to avoid backup of sewage into the building if sewage reached the level of the manhole cover 20, i.e., to the extent the level of sewage in manhole installation 18 is above the house foundation, sewage can back up into the building 10. The backflow valve is a form of check valve. The backflow valve installation is usually relatively expensive, involving not only the operating hardware but also a concrete box for access to the valve, a lid for the box, etc. With my new cover and relief valves 22, installed on a cleanout pipe, a backflow valve installation would be avoided, as any head of sewage in manhole installation 18 would result in opening of the cover and relief valve 22 draining sewage onto the ground or gradeline 24, avoiding rising of sewage into building 10 without the expense of a backflow valve, and with more reliability because a backflow device in the form of a check valve inherently is subject to more chance of malfunction than my simpler mechanical relief valve.

I have also indicated a property-line cleanout 26 and it is assumed this will be the prior type of cleanout with a threaded plug, as the location would often be unsuitable for an exposed cover and relief valve 22 and there would be no advantage as the other valves 22 take care of the needed drainage function, the property-line cleanout merely being a requirement under certain building codes. The lines 28 represent connection of building sewer line 12 to building 10 for toilets, sinks, drains, showers and baths, etc., according to common practice.

It will be understood from FIG. 1, and perhaps from personal experience, that blockage of building sewer line 12 results in failure of drainage from lines 28. This can result, in prior conventional installation, not only in rising of sewage in drains, toilets, etc., but also can result in flow out on floors causing a mess to clean up and sometimes causing expensive damage to rugs, floors, etc., i.e., any head of sewage above floorline 29. A toilet can overflow on the floor due to the pressure head from the watercloset. Any floor drain lower than the toilet can overflow from toilet or other drains such as sinks at a higher level. In the case of buildings with basements, any source of sewage on the first floor can cause flow out of fixtures or drains in the basement in case of sewer blockage. In the case of buildings of more than one story, upper floor sources of sewage can cause drainage out of first floor fixtures and drains. If a washing machine or dishwashing machine is in operation and unnoticed at the time of sewer backage, a considerable body of water can be discharged during wash cycles. Sewer blockage usually will have to be remedied by obtaining the services of a plumber, who will take the plugs out of one or more cleanouts (in conventional installations) and use a snake type device to unplug the source of blockage. One factor that may have led to my conception of this invention is that a plumbing service should respond to a householder having overflowing, that the householder should locate a cleanout and take out the plug, so that the sewage can drain onto the ground to alleviate the condition until a plumber arrives. It follows that the overflowing into the building would not have occurred in the first place if a relief valve function had been provided for the cleanout instead of a threaded plug.

The householder may have difficulty in locating a cleanout plug, because of a covering of dirt, and sometimes even a plumber may have difficulty figuring out the location of a covered cleanout plug. In fact, occasionally a householder, not knowing of the existence or location of a covered plug, may have poured a concrete walkway, patio, etc. over a cleanout. My cleanout cover and relief valves 22, as depicted in FIG. 1, are adapted to be exposed, preferably above the ground level, so that the valve not only automatically relieves pressure but also avoids the discussed problems due to cleanout plugs becoming covered.

From FIG. 1, building conditions can be visualized, in prior installations, if the main sewer line 14 becomes blocked, if a backflow valve fails, if sewage rises to the level of manhole cover 20, and if sewage backs up into building 10. The amount of building damage manifestly can be great. I suggest the use of my cleanout cover and relief valve 22 as a substitute for prior backflow valves, but even if a conventional backflow valve is used, my valves 22 will take care of the problem in the case of malfunction of the backflow valve.

Turning now to the construction of my cleanout cover and relief valve 22 specifically depicted in FIGS. 2-7, preferably the unit sold includes a coupling 30 which can follow common coupling designs except for the abutments hereafter to be described. Coupling 30 has an inner annular ridge 32 forming a seat for the upper pipe portion 34 of cleanout 16. Although it would be possible to use partly or totally metal parts for my valve 22, plastic pipe and fixtures are used in most sewer installations at present and valve 22 would naturally be also made of plastic. Chief exceptions are cast iron pipes required in certain buildings or portions of buildings such as commercial buildings or multi-story buildings. It is assumed for present purposes that cleanout 16 is plastic and a plastic coupling 30 is bonded in place.

Valve body 40 should be light and plastic is a suitable material not only for lightness but also for economy of manufacture. Body 30 in a prototype weighed slightly below four ounces. One reason for lightness is so that blocked sewage pressure will have no difficulty in raising body 40. Preferably body 40 and coupling 30 will be manufactured in a green color so as to have least visibility exposed above the ground in most building landscape situations.

One function of body 40 is as a cover for the cleanout pipe, and the top 42 of body 40 preferably has a circular shape with a generally horizontal, planar under surface. Although it would be feasible, if required, to provide a configured valve seat, gaskets, etc., a flat surface seating on the top edge of coupling 30 should generally be suitable, i.e., a seal 100 percent airtight does not seem to be needed. One reason for providing coupling 30, rather than associating body 40 directly with cleanout pipe 16, is that couplings 30 can have good manufacturing tolerances as to squareness, surface smoothness, etc., whereas it would be difficult to provide an upper end for cleanout 16 sufficiently square, smooth, etc., and the effort would be expensive of plumbers time. It will be understood that cleanout 16 usually will be fabricated from a cleanout fitting installed in the building sewer line and an upright pipe cut to the needed vertical length and installed in the fitting, so the upper portion of cleanout 16 is a pipe cut to length on the site. Another reason for using coupling 30 is the need for applying abutments thereto, which is an operation only economically done in a manufacturing facility.

Body 40 should loosely fit the sides of coupling 30 so there is a minimum of sliding resistance to rising of body 40 under blocked sewage pressure, i.e., 1/16 difference between the coupling OD and the body ID. The lower portion of body 40 is formed by a lower annulus 50 and a series of webs 52 connecting annulus 50 to top 42. A series of discharge openings 54 are thereby formed in the space between top 42, annulus 50 and webs 52. The area of discharge openings 54 exposed in the uppermost position of body 40 preferably should be at least as large as the horizontal cross-sectional area of cleanout 16, so the discharge openings can not impede flow of sewage out of cleanout 16 under blocked sewer line conditions. Normally the building service line, and cleanouts 16, will be 3 inches, although on certain buildings they may be larger, i.e., 4 inches.

The molding of body 40 from plastic, i.e., the same plastic material as the sewer pipe, will be understood to be of very economical manufacturing cost and of suitable quality and tolerances.

Abutments should be provided to define the maximum level of body 40, the extreme upper position under conditions of sewage discharge, so as to insure closure, to a lower, closed position, under force of gravity, upon cessation of sewage discharge, i.e., to avoid escape of body 40 from installed position. An economical expedient to achieve this end is the use of a series of screws 60, one for each discharge opening, threaded into openings 62 in coupling 30, the heads of the screws forming an abutment to annulus 50, to hold the parts in place. When it is desired to perform cleanout operations through cleanout 16, screws 60 are removed, whereupon body 40 can be removed to provide access for a snake-type tool.

The operation of my invention has been described in connection with the foregoing. FIG. 1 shows the general installation and FIG. 7 shows the specific installation on a cleanout pipe. FIGS. 3 and 7 show the normal closed position of the cleanout cover and relief valve. FIG. 2 illustrates movement to an upper position under discharge sewage pressure.

From the foregoing description, it will be understood that I have provided a solution to certain problems in building sewer installations. Its use is not only for sewer cleanouts but also as a possible substitute for backflow valves, in which circumstances a considerable savings is effected. In any case, the construction is quite economical. Good appearance is provided, and landscape color matching, particularly green, is readily achieved. The operation is simple, and the apparatus does not require maintenance. Of course the assembly 22 should not be covered or impeded with dirt, but this should be obvious to one acquainted with the function of the apparatus.

Having thus described my invention, I do not wish to be understood as limiting myself to the exact details of construction shown. It will be obvious to those skilled in the art, after learning of my invention, that various other expedients may be used to perform the same or comparable functioning, whether or not they are of equal merit. I wish to cover those modifications of my invention that will occur to such persons after learning of my invention, which fall within the proper scope of my invention.

I claim:

1. Means serving as a combined cover and relief valve for a pipe which rises vertically from a conduit carrying fluid comprising, in combination, a plastic coupling fixedly mounted on the upper end of said pipe, the upper end of said coupling forming a discharge surface, a hollow, cylindrical, plastic valve body closed at one end and having discharge openings in the body wall, said body being slidably mounted on said coupling for vertical movement and encompassing the outer surface thereof, the said body, under the effect of gravity, having a normal lower position on said coupling so that the closed end abutts said upper end of said coupling as a cover for said pipe, said body, under the pressure of fluid rising in said pipe, having an upper position on said coupling so that said discharge openings uncover said discharge surface to permit outflow of said fluid, and removable abutment means acting between said coupling and said body to prevent movement of said body above said upper position and the separation of said body and said coupling.

2. The cover relief valve according to claim 1 in which said body comprises a circular top end with a horizontal, planar under-surface, a lower annulus of the diameter of said top fitting around said coupling and slidable vertically thereon, and a plurality of spaced, vertical webs between said top end and said annulus providing a plurality of fluid discharge openings between said webs, said annulus and said top end, the sum of the areas of said fluid discharge openings exposed above the upper end of said coupling in said upper position of said body being at least as great as the interior cross-sectional area of said pipe, so as to not limit fluid outflow when said body is lefted to said upper position by blocked fluid pressure.

3. The cover and relief valve according to claim 1 in which said removable abutment means comprises at least one threaded member and at least one opening in said coupling into which said threaded member is threadedly secured, said body being positioned on said coupling so that said threaded member is located in one of said fluid discharge openings to form an abutment against said annulus when said body is in said upper position.

4. The cover and relief valve according to claim 3 wherein said coupling carries an inwardly extending ridge on the interior surface of said coupling to form an annular seat for the end of the upper portion of said pipe.

* * * * *